United States Patent [19]
Ozden et al.

[11] Patent Number: 5,708,796
[45] Date of Patent: Jan. 13, 1998

[54] METHOD OF RETRIEVING CONTINUOUS AND NON-CONTINUOUS MEDIA DATA FROM A FILE SYSTEM

[75] Inventors: Banu Ozden, Summit; Rajeev Rastogi, New Providence; Abraham Silberschatz, Summit, all of N.J.

[73] Assignee: Lucent Technologies Inc., Murray Hill, N.J.

[21] Appl. No.: 341,827

[22] Filed: Nov. 18, 1994

[51] Int. Cl.$^6$ .............................. G06F 15/00; G06F 17/00
[52] U.S. Cl. ...................... 395/494; 395/495; 395/425; 395/621
[58] Field of Search .................... 395/600, 425, 395/494, 495, 621

[56] References Cited

U.S. PATENT DOCUMENTS 5,390,313  2/1995  Yanai et al. .......................... 395/425

OTHER PUBLICATIONS

Rangan et al., "Designing an On-Demand Multimedia Service" IEEE, pp. 56–64, Jul. 1992.

Anderson et al., "A File System for Continuous Media", ACM Transactions Computer Systems, vol. 10, No. 4, pp. 311–337, Nov. 1992.

U.S. application No. 08/260,856, Biliris et al., filed Jun. 16, 1994.

A. L. N. Reddy and J. C. Wyllie, "I/O Issues in a Multimedia System", *IEEE Computer Soc.*, Mar. 1994.

P. V. Rangan and H. M. Vin, "Designing File Systems for Digital Video and Audio", *Proceedings of the Thirteenth Symposium on Operating System Principles*, Dec. 1991.

J. Gemmell, S. Christodoulakis, "Principles of Delay-Sensitive Multimedia Data Storage and Retrieval", *ACM Transactions on Information Systems*, vol. 10, No. 1, Jan. 1992, pp. 51–90.

Primary Examiner—Thomas G. Black
Assistant Examiner—Cheryl R. Lewis

[57] ABSTRACT

A method of scheduling the retrieval of both continuous and non-continuous data retrieves continuous data streams at a predetermined rate. At least one server receives one or more requests for the retrieval of a stream of media data by at least one terminal. Each requested media stream is characterized by a playback rate $r_i$. A common retrieval time period is established for each requested media stream. The common retrieval time period is a function of the playback rate. The retrieval of the requested media stream is scheduled in the order in which each request is received by the server.

27 Claims, 1 Drawing Sheet

METHOD OF RETRIEVING CONTINUOUS AND NON-CONTINUOUS MEDIA DATA FROM A FILE SYSTEM

BACKGROUND OF THE INVENTION

The present invention relates to a method of scheduling the retrieval of data from a file system, and more particularly, to a method of scheduling the retrieval of continuous media data streams and non-continuous data from a file system.

Systems which facilitate the continuous retrieval of concurrent requests for multimedia data files are becoming more popular. Such systems can be used to provide multimedia services such as multimedia electronic mail, news, lectures, hypermedia documents, and movies on demand. Multimedia data typically includes data such as digital audio, animation and video data. These types of multimedia data are sensitive to delay in that successive units of data must be presented to a given client within a real-time deadline in order for the data to be correctly reproduced. For example, delivery of digital audio samples to a digital-to-analog converter must occur at a precise rate or the represented sounds are not properly reproduced. Likewise, if video and animation data are not delivered at a precise rate, image motion tends to be interrupted and not flow smoothly.

As mentioned above, these systems are also required to handle multiple data requests concurrently. For example, a server must be capable of simultaneously retrieving different files for different clients. Such considerations impact on the disk scheduling techniques used to handle the requests, as well as the procedures used to determine whether a request for data retrieval can be "adequately" handled. "Adequate" handling of data retrieval can include considerations such as, but not limited to, the ability to continuously transmit a data stream, the ability to guarantee the rate at which a stream is transmitted, and the ability to interleave non-continuous data transmission with continuous data transmission.

Systems, such as personal computers, workstations and other types of multimedia devices, must also be able to deliver non-continuous data files. Conventional file systems do not provide the means for ensuring that a given guaranteed rate is maintained for a real-time request. As such, these systems are not capable of supporting a large number of real-time requests along with non-real-time requests. A continuous media file system should be able to provide guarantees to its clients so that once a real-time request of a client is accepted, the data transfer for the client is performed at a guaranteed rate. The file system should also be able to handle a large number of real-time requests with different rates. At the same time, the system should not degrade the performance of non-real-time requests.

SUMMARY OF THE INVENTION

In accordance with the present invention, a method of scheduling the retrieval of data is realized in which both continuous and non-continuous data requests can be handled, and in which continuous media data streams can be retrieved at a predetermined rate. The file system comprises at least one server and a plurality of terminals. One or more requests for retrieval of a stream of media data by at least one of the terminals are received by the at least one server. Each requested media stream is characterized by a playback rate $r_i$. A common retrieval time period is established for each requested media stream. The common retrieval period is a function of the playback rate. The retrieval of the requested media streams is scheduled in the order in which each request is received by the server.

DETAILED DESCRIPTION

Figure 1:
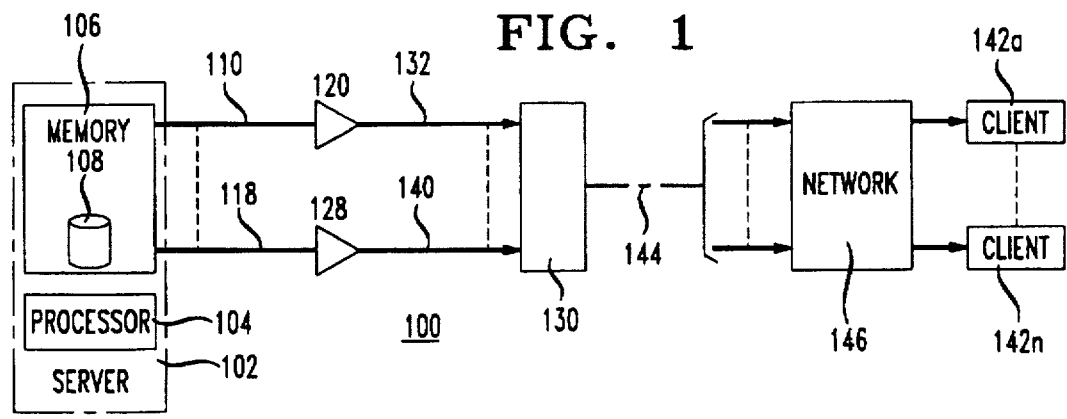
FIG. 1 shows, in simplified form, a block diagram of an architecture of a file system which implements a method of retrieving continuous and non-continuous data files in accordance with the present invention.

FIG. 1 shows, in simplified form, the architecture of a file system 100 which implements a method of retrieving continuous and non-continuous media data files in accordance with the present invention. Specifically shown is server 102 which may be a personal computer or work station which comprises a processor 104 and memory 106. Included in the memory 106 are one or more random access memory (RAM) disks 108. The RAM disks 108 serve to store continuous media information such as, but not limited to, digital audio, animation or video data. Also stored on the RAM disks 108 are non-continuous data files such as document files. This continuous and non-continuous data are retrieved from RAM disks 108 and transmitted along transmission lines 110, 118 to RAM buffers 120, 128.

The output of each RAM buffer is linked to switch 130 via one of lines 132, 140. The output of switch 130 may be selectively linked to one of clients 142a-142N via transmission lines 144 and network 146. The client may be a terminal, personal computer, workstation or any other type of device capable of reading and writing both continuous and non-continuous data. The network may be any type of network used to connect a plurality of clients to a server including, but not limited to a wide area network (WAN) or a local area network (LAN). Only two transmission lines are shown exiting server 102; however, as indicated by the dots shown in FIG. 1, transmission lines can be added to provide for an increased number of clients 142. As shown, line 144 serves to convey client-generated information into the network 146 and line 144 also serves to provide the client with information from the server 102.

Figure 2:
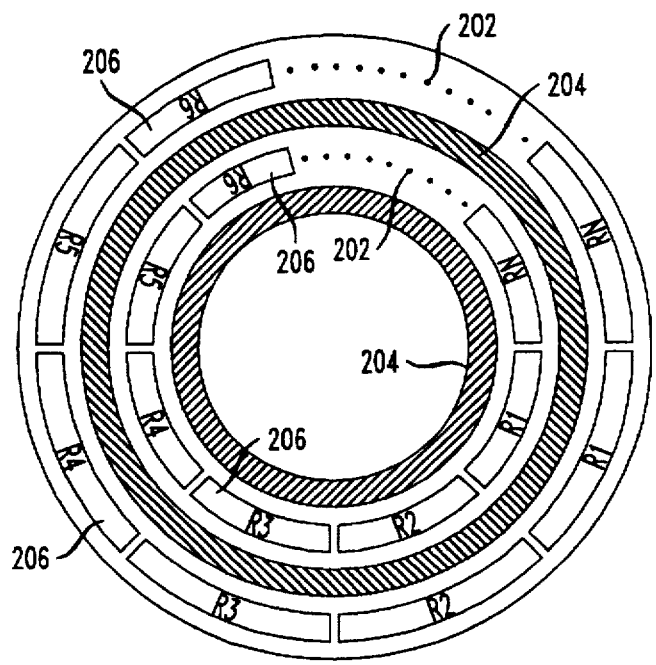
FIG. 2 shows, in simplified form, a schematic diagram of the layout of the continuous and non-continuous data on one of the disks illustrated in FIG. 1.

Requests $R_i$ for retrieval of both continuous and non-continuous data streams are received by server 102 from the clients 142. The data is stored on RAM disks 108. A representative disk layout is illustrated in FIG. 2. The disk is comprised of a series of rings which are referred to as tracks 202. Adjacent tracks are separated by gaps 204. Data is transferred to and from (referred to as read and write, respectively) the disks in blocks. Typically the size of the blocks are not equal to the size of the tracks 202. As such, blocks of data may be contained within a sector 206 of a track 202.

Figure 3:
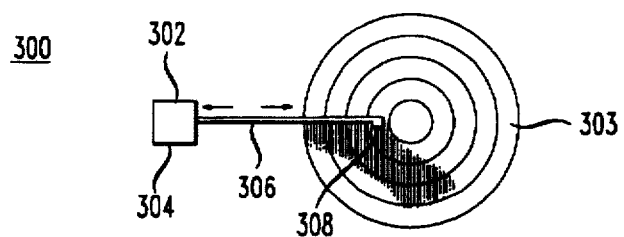
FIG. 3 is a flow chart of a method of optimizing retrieval of data which may be implemented by the system of FIG. 1.

FIG. 3 illustrates a conventional disk system 300 which may be used in implementing a method of retrieval of continuous or non-continuous data in accordance with the present invention. When data is to be read from or written onto the disk, the disk 303 is inserted into a disk drive 302. The disk drive comprises a movable disk arm 304, a shaft 306 which rotates the disk and electronics needed for input and output of binary data. The disk is rotated and a disk head 308 attached to the disk arm 304 is positioned on the particular track for which the data is to be read or written. The movable arm 304 directs the head 308 to the appropriate track.

As indicated above, media streams are retrieved from the server 102 in response to requests from the clients 142. The rate $r_i$ at which information is transmitted to network 146 (and therefore to the clients 142) from server 102 cannot exceed the bandwidth of any given one of the transmission lines 144. Each stream is characterized by a playback rate $r_i$ a unit of retrieval $d_i$, and an arrival time $a_i$. The response time for a request is equal to the difference between the time when the requested stream starts and the arrival time of the request.

In order to display continuous playback of a media stream, there must be a continuous stream of $d_i$ units available. In other words, once the bits contained within a unit of retrieval have been consumed, the beginning of the bits contained in the next unit of retrieval must be available. The time required to retrieve a single unit of bits is referred to as the retrieval time period $T_i$. The retrieval time period is determined as follows:

$$T_i = \frac{d_i}{r_i} \quad (1)$$

where:

$T_i$=period
$d_i$=unit of retrieval
$r_i$=playback rate

The lower bound on the period of any request is determined by the disk controller overhead which is typically in the range of 0.3–1 ms, and the upper bound on the period is determined by amount of buffer space. For a round of requests, the time required to retrieve a unit of bits is equal to the following:

$$C_i = \frac{d_i}{r_{disk}} + t_{lat} \quad (2)$$

where $C_i$=time to retrieve $d_i$ bits
$d_i$=unit of retrieval
$r_{disk}$=bandwidth (transfer rate) of the disk
$t_{lat}$=maximum latency Each request $R_i$ is treated as a sequence of instances, each of which arrives at the beginning of a period. The end of the current period of a request is referred to as its deadline. Each request is scheduled so that the request with the smallest deadline at each decision point is completed first. A schedule in which all requests meet their deadlines is called a feasible schedule. However if one request is completed prior to another request because of a smaller deadline, preemption can occur. In the case of media data, such preemptions are not permissible.

In accordance with the present invention, a common retrieval time period is determined for the requests so that each request is completed in the order in which it is received and, the server 102 effectively acts as a first-in-first out (FIFO) processor. The period for each request can be conformed to the common period by modifying the unit of retrieval for a particular request. If the smallest unit of retrieval is d, a common period can be determined where $T \cdot r_i$ is a multiple of d.

For example, if three requests are received by the server 102 for the retrieval of data in which each media stream has a different retrieval rate ($r_1$=1.2 Mbps, $r_2$=1.5 Mbps, $r_3$=3 Mbps). If the smallest unit of retrieval d is 512 bytes and the period T is desired to be 1 second the unit of retrieval for each request can be determined. Since 1 second is approximately 24.4 times longer than 512/0.1 bytes/Mbps the common period can be selected to be 1.024 seconds. As such, the units of retrieval for each request are equal to $d_1$=153 KB, $d_2$=192 KB and $d_3$=384 KB.

In order to determine if a feasible schedule has been accommodated by the common period method the following admission control mechanism can be implemented:

$$\sum_{i=1}^{m} C_i \leq T \quad (3)$$

Further optimization may be performed by reducing the latency $t_{lat}$. Two factors which can be attributed to latency are seek time and rotational delay. In accordance with the present invention the order in which data is retrieved from the disk is dependent on the location of the track on which the data is located. Data is retrieved in a sequential manner so that as the disk arm is making a single pass from one end of the disk to the other, requests are being serviced as each track which contains data to be retrieved is reached.

The method for determining a common period for retrieval which is described above may be combined with known disk scheduling methods such as, but not limited to, SCAN, C-SCAN, LOOK and C-LOOK to reduce the seek time associated with data retrieval. The arrival of a request for data retrieval at an idle disk is referred to as a burst b. Assuming that a jth burst starts at time $b_j$, the queuing of a request $R_i$ which has arrived during the jth burst is delayed until $$b_j + \left[ \frac{a_i - b_j}{T} \right] \cdot T \quad (4)$$

This delaying ensures that the instances of all requests arrive at the same time and therefore that the deadlines of all instances are equal. As a result, the order of servicing requests can be selected without violating the deadlines so that the aggregate seek time for all the admitted requests is decreased. The requests can then be serviced in accordance with any known disk scheduling method such as one of the methods mentioned above.

For example, if the SCAN method is used, the disk head starts at one end of the disk and moves toward the other end, servicing requests as it reaches each cylinder until it gets to the other end of the disk. Once the disk head reaches the other end of the disk, the scanning direction is reversed and disk requests are serviced as the disk head moves to its original location. The disk head continuously scans the disk from one end to another. The LOOK method is similar to the SCAN method, however, the disk head is only moved in a given direction as far as is needed to serve a particular request. As soon as there are no more requests in the direction in which the disk head is currently scanning, the direction of scanning is reversed.

The common period of retrieval in combination with one of the disk scheduling methods described above produces a worst case seek time S as follows:

$$S = m \cdot t_{settle} + 2 \cdot t_{seek} \quad (5)$$

where m=number of requests
$t_{settle}$=settle time
$t_{seek}$=maximum value for seek time A feasibility schedule for a given set of m requests can be determined as follows:

$$\sum_{i=1}^{m} \frac{d_i}{r_{disk}} + m \cdot t_{rot} + S \leq T \qquad (6)$$

where $d_i$=unit of retrieval $r_{disk}$=bandwidth of the disk m=number of requests $t_{rot}$=maximum value of rotational delay S=seek time T=common retrieval period In accordance with the present invention a disk scheduling method referred to as SLOOK may also be used in combination with the common retrieval period to further reduce the seek time. The SLOOK method is used after the last request within a given period has been serviced to determine the location of the closest request contained in the next period. For example, if the last request of the period has been serviced at the kth cylinder, a determination must be made as to which request contained in the next request is closest to the current location of the disk head. If the kth cylinder is not located at an extreme end of the disk, the requests nearest in either direction from the kth cylinder must be identified. Assuming the distance between the disk head and a request in a first direction is $l_1$ tracks and the distance between the disk head and a request in a second direction is $l_2$ tracks. If both $l_1$ and $l_2$ are greater than zero, at the beginning of the next period the head is moved toward the end for which $l_i$ is smallest without servicing the requests. The head is moved in this direction until the last request in this direction is reached. The direction of the head movement is then reversed and the requests are serviced in the order in which they are reached. If either $l_1$ or $l_2$ is equal to zero, the disk head is moved in the direction in which $l_i$ is greater and each request is serviced in the order in which it is reached. For m requests the aggregate seek time $S_{slook}$ is equal to:

$$S_{slook} = m \cdot t_{settle} + [2 \cdot (l_1 + l_2) - \max\{l_1, l_2\}] \cdot \frac{t_{seek}}{n_c} \qquad (7)$$

where $n_c$=number of cylinders on the disk.

Methods for optimizing rotational delay can also be applied in combination with the common retrieval period to reduce the amount of disk latency time and help guarantee the continuous transfer of data at a promised data rate. Rotational latency is typically defined as the amount of time required for the disk head to reach the starting point of a given data stream once the disk head has located the appropriate track.

For example, after data corresponding to a particular data request has been read, the disk head is moved to the track which contains the data corresponding to the next request. As the disk head travels radially to reach the disk track, the disk is spinning. When the disk head reaches the disk track, the disk head may not be circumferentially positioned on the track at the point where the data corresponding to the request begins. As such, data retrieval is postponed until the rotation of the disk aligns the appropriate sector of the track with the disk head.

In accordance with the present invention, for each instance of a request for data retrieval, data retrieval starts immediately at the time when the disk head arrives at the track on which the data is stored regardless of whether the disk head is at the point where the data begins. As such, rotational latency is eliminated. In addition, data is retrieved as integral number of tracks. The amount of data retrieved for each request can be different. Either one or more integral tracks are retrieved during each period (except for the last period), or no data are retrieved. During the last period, the remaining data are retrieved.

Storage allocation of each media stream or clip is arranged such that each track contains data from no more than one clip. If a clip does not fill an entire track, the remaining portion of the track can be used to store conventional data files, provided the files do not have to be retrieved at a guaranteed rate. If the size of a clip is equal to or greater than the storage capacity of the track, a first portion of the clip occupies a full track and the remainder of the clip is stored on another track.

After a given request has been satisfied, the disk head sweeps across the disk to the next track from which data is to be read. When the disk head is positioned over the track, the disk head immediately begins reading data from the track. As a result of the immediate reading of data, no rotational latency is incurred when servicing the request. Each request is serviced in the order in which it appears along the sweep so that the disk head services each request by moving in only one direction. Once the disk head reaches an end of the disk, the disk head is repositioned at the originating end to begin the next sweep.

The transfer rate of the innermost zone on which a clip resides is referred to as $r_{mini}$. The transfer rate of the outermost zone on which a clip resides is referred to as $r_{maxi}$. If $R_1, \ldots, R_{m-1}$ are the requests currently being serviced, then a new request $R_m$ is admitted if the following equation holds ($d_i = T \cdot r_i$):

$$\sum_{i=1}^{m} \frac{d_i}{r_{min_i}} + S_{slook} \leq T \qquad (8)$$

The data retrieved for a request during a sweep is always less than or equal to, and within a track of the data to be retrieved. The difference between the data retrieved and the data to be retrieved for a request is referred to as the slack for the request. In case there is slack after a request has been serviced during a sweep, the data to be read during the next sweep is increased by the amount of slack so that additional bits can be read in order to eliminate slack. Thus, the slack cannot accumulate indefinitely and is always less than the size of a track. Also, at the start, consumption of data for a request is delayed until an additional track of data is retrieved into its buffer. The additional track is used to ensure that bits missing due to slack are available for consumption until the slack is made up for in a subsequent sweep.

Note that retrieving additional bits corresponding to the slack for a request during a sweep does not cause other requests to starve. The reason for this is that since slack is basically the number of bits less that were read for a request, if there is slack for a request, then the service time for the request reduces by the time to retrieve the slack from disk. Thus, every sweep terminates earlier by the sum of the time taken to retrieve slack bits for every request. The next sweep is begun earlier by the sum of the time taken to retrieve slack bits for every request, and consequently, every request is serviced earlier by the time it takes to retrieve from disk the sum of all the slacks. As a result, when a request $R_i$ is serviced, its buffer contains additional bits equal to $r_i$ times the time to retrieve the sum of all the slacks. Thus, for a request, retrieving additional bits from disk equal to the slack does not result in other requests starving. Also, in the worst case, if $R_1, \ldots, R_m$ are the requests being serviced, then the total slack can be at most $$\sum_{k=1}^{m} \text{tck\_size}_k,$$

where $\text{tck\_size}_k = r_{max_k} \cdot t_{rot}$ is the maximum size of a track containing data for $R_k$. As a result, the additional bits in the buffer for request $R_i$ in the worst case could be $$r_i \cdot \sum_{k=1}^{m} \frac{\text{tck\_size}_k}{r_{min_k}}. \qquad (10)$$

Thus, the size of the buffer for request $R_i$ required is $$2 \cdot d_i + \text{tck\_size}_i + r_i \cdot \sum_{k=1}^{m} \frac{\text{tck\_size}_k}{r_{min_k}}. \qquad (15)$$

With every request $R_i$, the slack for the request is maintained, which we denote by $\delta_i$. Also, we denote the value of $\delta_i$ at time t by $\delta_i(t)$. Initially, $\delta_i$ is set to 0. The amount of data retrieved for a request $R_i$ during a sweep is computed as follows. Let $t_b$ and $t_a$ be the times just before and after $R_i$ is serviced. The amount of data retrieved d is the maximum number of tracks such that the following condition holds:

$$d \leq d_i + \delta_i(t_b) \qquad (9)$$

Note that since the maximum number of tracks are read and $\text{tck\_size}_i$ is the maximum size of a track containing data for request $R_i$, $d_i + \delta_i(t_b) - \text{tck\_size}_i < d$. Immediately after the request is serviced, the slack $\delta_i(t_a)$ is set to 0 if all the data for $R_i$ has been retrieved. Else, $\delta_i(t_a)$ is set to $$d_i + \delta_i(t_b) - d \qquad (10)$$

The above equation ensures that the new slack is always less than or equal to the difference between the amount to be retrieved and the amount read. Once the $j^{th}$ sweep completes (say, at time $t_j$), the next sweep $(j+1^{th})$ is begun at $$\text{time } j \cdot T - \sum_{k=1}^{m} \frac{\delta_k(t_j)}{r_{min_k}}, \text{ where } \sum_{k=1}^{m} \frac{\delta_k(t_j)}{r_{min_k}}$$

is the time taken to criminate the cumulative slack.

Finally, for a new request $R_i$, consumption of bits from the buffer is initiated $$\frac{\text{tck\_size}_i}{r_i} + \sum_{k=1}^{m} \frac{\delta_k(t)}{r_{min_k}}$$

after t which is the completion time of the sweep in which the first time the request is serviced (this is equivalent to beginning consumption at the end of the sweep when the buffer contains $$d_i + \text{tck\_size}_i - \delta_i(t) + r_i \cdot \sum_{k=1}^{m} \frac{\delta_k(t)}{r_{min_k}} \text{ bits)}.$$

This ensures that in case additional slack bits are retrieved for other requests, request $R_i$ does not starve. Note that, for a new request, the data retrieved the first time it is serviced within a track of $d_i$, and the slack is the difference between $d_i$ and the amount read.

It will be appreciated that those skilled in the art will be able to devise numerous and various alternative arrangements which, although not explicitly shown or described herein, embody the principles of the invention and are within its scope and spirit.

We claim:

1. A method of scheduling the retrieval of data from recorded media contained within a file system capable of supporting storage and retrieval of both continuous and non-continuous media data, the file system comprising at least one server, the method comprising:

receiving a plurality of requests for retrieval of a stream of media data transmitted by at least one of a plurality of terminals, each requested media stream being characterized by a playback rate $r_i$;

establishing a common retrieval time period for each requested media stream, said common retrieval period being a function of the playback rate; and scheduling the retrieval time period for each requested media stream, said common retrieval period being a function of the playback rate; and scheduling the retrieval of the requested media streams in the order in which request has been received by the server.

2. The method according to claim 1 wherein said receiving step further comprises:

determining whether a received request for retrieving a particular media stream is to be accepted by said file system, said acceptance being a function of the retrieval time $C_i$ required to retrieve the particular media stream.

3. The method according to claim 2 wherein said determining step further comprises:

rejecting said request if the sum of the retrieval times $\Sigma C_i$ of all the data retrieval requests currently pending is greater than the common time period, the sum of the retrieval times including the retrieval time required to retrieve the particular media stream.

4. The method according to claim 1 wherein said step of establishing a common time period further comprises the step of determining a unit of retrieval for each request, said unit of retrieval being a function of the common time period and the playback rate $r_i$.

5. The method according to claim 1 wherein said step of establishing a common time period further comprises the steps of:

determining those requests which have been received within a given time interval;

grouping said requests received within the given interval into a set; and establishing a common retrieval period for the requests in the set.

6. A method of scheduling the retrieval of data from disks contained within a file system capable of supporting storage and retrieval of both continuous and non-continuous media data, the file system comprising at least one server, having media data stored on a disk storage system having at least one disk, the method comprising:

receiving one or more requests for retrieval of a stream of media data transmitted by at least one of a plurality of terminals, each requested media stream being characterized by a playback rate $r_i$;

establishing the requests received within a given time interval in an order for data retrieval based on the location of a track on the disk on which the data is stored;

scanning the disk from a first end to a second end;

retrieving the data associated with each request in the established order as the disk is scanned;

maintaining a buffer for storing the data, said buffer having a capacity for storing the equivalent of at least two data units; and determining the amount of slack resulting from the retrieval of a particular data request.

7. The method according to claim 6 wherein the amount of slack is determined by calculating the difference between the number of data bits which should have been read to avoid slack and the amount of data read in response to the request.

8. The method according to claim 7 further comprising the step of:

adjusting the time at which the reading of data for a subsequent data request commences, said commencing time being dependent on the amount of slack from the previous request.

9. The method according to claim 8 wherein said commencing time is before the end of the period for the previous request if there is slack associated with the previous request.

10. The method according to claim 7 further comprising the step of:

adjusting the amount of data read for a particular request, said adjustment being dependent on the amount of data read for a previous request.

11. A method of scheduling the retrieval of data from recorded media contained within a file system capable of supporting storage and retrieval of both continuous and non-continuous media data, the file system comprising at least one server having media data stored on a disk storage system having at least one disk, the method comprising:

receiving a plurality of requests for retrieval of a stream of media data transmitted by at least one of a plurality of terminals, each requested media stream being characterized by a playback rate $r_i$;

establishing a common retrieval time period for each requested media stream, said common retrieval period being a function of the playback rate; and establishing the requests received within the time interval in an order for data retrieval based on the location of a track on the disk on which the data is stored.

12. The method according to claim 11 further comprising:

scanning the disk from a first end to a second end; and retrieving the data associated with each request in the established order as the disk is scanned.

13. The method according to claim 12 wherein said scanning step further comprises:

scanning the disk from the second end to the first end.

14. The method according to claim 11 further comprising:

determining which request is to be retrieved after a previous common period has ended by identifying the request which is the shortest distance from the disk location at which the last request was retrieved in the previous common period.

15. The method according to claim 11 wherein said establishing step further comprises:

determining the corresponding disk track at which each requested media stream is stored; and scheduling the retrieval of the requested media streams such that the amount by which the disk must be rotated so that a disk head associated with the system is able to locate a position on the disk track at which a particular media stream is stored is reduced.

16. The method according to claim 15 wherein said retrieval of data in response to a request is performed by retrieving an integral number of disk tracks.

17. The method according to claim 16 further comprising:

dynamically changing the number of tracks retrieved during any particular period.

18. The method according to claim 15 wherein said scheduling step further comprises:

initiating the retrieval of data in response to a particular request when the disk head arrives at the disk track on which the data stream associated with the request is stored regardless of whether that portion of the disk track contains the beginning of the stream.

19. The method according to claim 15 further comprising the steps of:

maintaining a buffer for storing the data; and buffering a track of data prior to an initial reading of data.

20. The method according to claim 19 further comprising the step of:

determining the amount of slack resulting from the retrieval of a particular data request.

21. The method according to claim 20 wherein the amount of slack is determined by calculating the difference between the number of data bits which should have been read to avoid slack and the amount of data read in response to the request.

22. The method according to claim 21 further comprising the step of:

adjusting the time at which the reading of data for a subsequent data request commences, said commencing time being dependent on the amount of slack from the previous request.

23. The method according to claim 22 wherein said commencing time is before the end of the period for the previous request if there is slack associated with the previous request.

24. The method according to claim 21 further comprising the step of:

adjusting the amount of data read for a particular request, said adjustment being dependent on the amount of data read for a previous request.

25. A method of scheduling the retrieval of data from recorded media contained within a file system capable of supporting storage and retrieval of both continuous and non-continuous media data, the file system comprising at least one server having media data stored on a disk storage system, the method comprising:

receiving a plurality of requests for retrieval of a stream of media data transmitted by at least one of a plurality of terminals, each requested media stream being characterized by a playback rate $r_i$;

establishing a common retrieval time period for each requested media stream, said common retrieval period being a function of the playback rate;

scheduling the retrieval of the requested media streams by determining the corresponding disk track at which each requested media stream is stored; and scheduling the order of retrieval of the requested media streams such that the amount by which a disk must be rotated so that a disk head associated with the disk storage system is able to locate a disk track at which a particular media stream is stored is reduced.

26. A method of scheduling the retrieval of data from recorded media contained within a file system capable of supporting storage and retrieval of both continuous and non-continuous media data, the file system comprising at least one server, the method comprising:

receiving a plurality of requests for retrieval of a stream of media data transmitted by at least one of a plurality of terminals, each requested media stream being characterized by a playback rate $r_i$;

establishing a common retrieval time period for the plurality of requested media streams, said common retrieval period being a function of the playback rate; and conforming the period of each request to the common retrieval time period by modifying each request's unit of retrieval.

27. A method of scheduling the retrieval of data from recorded media contained within a file system capable of supporting storage and retrieval of both continuous and non-continuous media data, the method comprising:

receiving a plurality of requests for retrieval of a stream of media data transmitted by at least one of the plurality of terminals, each requested media stream being characterized by a playback rate $r_i$;

treating each request as a sequence of instances;

establishing a common retrieval time period for the plurality of requested media streams, said common retrieval period being a function of the playback rate; and delaying queuing of each request as necessary to insure that the instances of all requests arrive at the same time.

* * * * *